(12) United States Patent
Ricketts et al.

(10) Patent No.: US 7,566,266 B1
(45) Date of Patent: Jul. 28, 2009

(54) DUAL ACTION CORN COB SEPARATION AND IMPROVED CHAFFER FOR WHOLE CORN COBS

(75) Inventors: Jonathan E. Ricketts, Ephrata, PA (US); Denver R. Yoder, Manheim, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/152,177

(22) Filed: May 13, 2008

(51) Int. Cl.
*A01F 12/32* (2006.01)
*B07B 1/00* (2006.01)

(52) U.S. Cl. .................................................. 460/101

(58) Field of Classification Search ............... 460/100, 460/101, 102, 93, 902; 56/12.8; 209/394, 209/395, 404
See application file for complete search history.

(56) References Cited

U.S. PATENT DOCUMENTS

| | | | |
|---|---|---|---|
| 140,886 A | 3/1873 | Claflin | |
| 326,805 A | 3/1885 | Stroud | |
| 682,670 A * | 9/1901 | Closz | 209/394 |
| 798,382 A | 8/1905 | Allard | |
| 824,720 A | 7/1906 | Hunnicutt | |
| 1,257,802 A | 2/1918 | Butterworth | |
| 2,253,296 A * | 8/1941 | Holtzman | 209/394 |
| 2,370,717 A | 3/1945 | Christman, Jr. | |
| 3,334,744 A * | 8/1967 | Howell et al. | 209/394 |
| 3,385,438 A * | 5/1968 | Fisher | 209/394 |
| 4,511,466 A * | 4/1985 | Jones et al. | 209/395 |
| 4,531,528 A * | 7/1985 | Peters et al. | 460/97 |
| 4,600,019 A | 7/1986 | McBroom | |
| 4,605,496 A * | 8/1986 | Becatti | 209/394 |
| 4,892,505 A | 1/1990 | Shrawder | |
| 5,041,059 A * | 8/1991 | Ricketts et al. | 460/101 |
| 5,176,574 A | 1/1993 | Matousek et al. | |
| 5,256,106 A | 10/1993 | Shrawder | |
| 5,466,190 A * | 11/1995 | Skinner et al. | 460/101 |
| 5,941,768 A | 8/1999 | Flamme | |
| 6,053,812 A * | 4/2000 | Loewen et al. | 460/101 |
| 6,358,141 B1 | 3/2002 | Stukenholtz et al. | |
| 6,379,243 B1 * | 4/2002 | Schumacher et al. | 460/101 |
| 6,468,154 B1 * | 10/2002 | Eggenhaus et al. | 460/101 |
| 7,011,579 B2 | 3/2006 | Gorden | |
| 7,399,223 B2 * | 7/2008 | Weichholdt et al. | 460/101 |

FOREIGN PATENT DOCUMENTS

| | | |
|---|---|---|
| JP | 8037904 | 2/1996 |
| JP | 06246779 | 9/2006 |

OTHER PUBLICATIONS

Biomass Magazine article from Sep. 2007, entitled Nebraska Corn-cob Harvesters.

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A dual action corn cob cleaning separation system having a whole corn cob sieve with elongated and rounded finger extensions for reorienting corn cobs traveling widthwise to instead travel lengthwise.

6 Claims, 7 Drawing Sheets

DUAL ACTION CORN COB SEPARATION AND IMPROVED CHAFFER FOR WHOLE CORN COBS

TECHNICAL FIELD

This invention relates to the threshing, separating, and cleaning of corn cobs, and particularly to the cleaning of whole corn cobs, to remove MOGC (material other than grain or cobs), after the corn kernels have been separated from the cobs. The MOGC is comprised of, for example, stalk portions, leaves, husks, tassels or silks, and other debris of generally lighter density than the cobs. This invention even more particularly relates to improvements for chaffer sieves employed on combine harvesters, to separate whole corn cobs from other residue.

BACKGROUND ART

Corn cobs have, for many years, added a certain measure of value to the harvest. Prior to the early 60's, the common corn harvesting practice was to pick the ears in the field, transport the crop to corn cribs, and later shell the corn off the cob at stationary shellers. The need to dispose of the cobs, after shelling, spurred most of the early research for useful corn cob end products. However, using stationary shellers limited the volume of cobs which had to be dealt with.

The advent of in-field shelling, by self-propelled combine harvesters, created extreme efficiencies. The combine harvesters were designed to recover only shelled corn, or shelled corn incorporating only small amounts of cob, while crushing and discharging most of the cob back onto the ground. Early attempts to recover the cobs included adjusting the fingered vanes, on the harvester's chaffer, in order to open them wider and thus allow larger amounts of broken cob to fall through. However, this caused pieces of cob to lodge in the fingers and plug the chaffer. Accordingly, the vanes were lowered back to prevent plugging. Thus, only reduced volumes of cob residuals could be obtained for corn-and-cob-mix products.

In fact, in 1986, Chester McBroom was granted a patent on the Corn Cob Saver Sieve (U.S. Pat. No. 4,600,019). One drawback was the cobs could not be directly retrieved from the combine harvester. However, McBroom discovered, inter alia, that a cob-saving sieve structure need only have its inclined parallel vanes at an angle of 45°, and have the spacing between vanes 2" apart, to allow shelled corn and harvested cob segments to pass therethrough. His goal was to provide a corn and cob segment mix.

Retrieval of cobs directly, separately, and automatically from the combine was nevertheless undertaken by Larry Shrawder and disclosed in 1989 (U.S. Pat. No. 4,892,505) and then in 1993 (U.S. Pat. No. 5,256,106). Therein, combine harvest separator arcs were modified to a circular shape, from elliptical; and, the cross bar spacing on sieve slots was altered; and a cob conveyor was added. Again, the sieve slots were altered to a width of only 2-3 inches. His process and the special features of his combine design still limited harvesting to only cobs having lengths which did not exceed 2-3 inches.

In 1999, Vernon L. Flame, in U.S. Pat. No. 5,941,768 entitled Corn Cob Collecting Apparatus For Use With Combines, dealt with the problem of harvesting dry corn cobs. He found that the cobs could not be effectively separated from the stalks, husks, etc. through the use of air. Accordingly, he did not attempt to have cobs fall through the openings of a chaffer sieve. His solution was to use a wheeled apparatus connected to the rearward end of the combine in order to achieve separation of the cobs from a stream of crop material being discharged at the rearward end of the combine, where said end normally was designed to discharge the corn cobs, stalks, husks, etc. onto the ground.

In 2002, U.S. Pat. No. 6,358,141, by Stukenholtz, disclosed an on-board system for separating whole corn cobs by modification to the sieve and straw walker system. However, the system although allowing for the 2 inches between fingered vanes of the chaffer to allow the width of the cobs, offers no other sieve design modifications.

In recent years, as the demand and utilization of fossil fuels has skyrocketed, likewise has the demand for corn cobs as alternative renewable energy sources and as feedstock for environmentally friendly biodegradable packaging. Enormous volumes of corn cobs are needed as a principal feed stock for ethanol fuels. One company plans on harvesting cobs from plots having a minimum of 4000 acres as a component of their system that will eventually handle harvesting as much as 275,000 acres of cobs by as early as 2011. The cobs will be used, inter alia, by public utility companies as biomass to co-fire with coal, because the cob's burn value is competitive with that of wood.

For projects of this size and volume, cobs will be stored outside. Since broken cobs would more readily mold, and decay than whole cobs, the goal currently is to harvest the cobs as whole, or in lengths as long as possible. The industry therefore needs no cobs less than 3 inches in length, and as many whole cobs as possible. If the cobs were broken up, they would require storage in a dry environment, and much greater cost. One principal stumbling block to advancements in higher cob volume and higher pass throughs in sieve design was pointed out by Gordon in U.S. Pat. No. 7,011,579, issued in March 2006. Gordon pointed out that the proper opening between louvers is necessary, but if the opening is too large, straw and other material fall through contaminating the grain.

An improved chaffer and cleaning system for combine harvesters that would significantly enhance the recovery and harvesting of whole corn cobs, greater than 3" in length, would fulfill a longfelt commercial need and provide a novel and unexpected technical advancement in the art.

SUMMARY OF THE INVENTION

The combines of the invention are axial flow combines which use, for its threshing zone, one or more horizontally arranged rotors which are rotated in associated threshing cages or chambers, and which cages are partly constituted of threshing and separating concaves and partly of grates. The crop material is subjected to a much longer threshing and separation cycle than in conventional combines and therefore, the efficiency of axial flow machines is greater. A higher degree of separation is reached and the grain losses are reduced.

The concaves are provided at the front end of the threshing cage surrounding the rotor and grates are provided at the rearward end, and constitute the lower portion of the cage. The top portion of the cage comprises a curved cover which has, at its inner surface, a set of fins or vanes to guide the crop rearwardly along a spiral path to the rearward end of the threshing and separating zone.

In the method of the invention, the crop material mat revolves around the rotor continually, while separating first the kernels, through concaves at the front portion of the cage, and second, separating the whole cobs, through grates, at the rearward end of the cage.

By allowing the threshed cobs to fall from the rotor's threshing area, at the front of the machine, onto a cleaning area at the front of the chaffer sieve of the combine, the cobs (having corn kernels removed) can be harvested at the rear of the sieve, in a dual action, in tandem with the threshing and separation of corn kernels occurring at the front. The cleaning area, located below the threshing zone, includes a novel chaffer sieve to remove the MOGC and other leafy debris, allowing the cobs and the grain to be transported to separate holding bins.

In accordance with this invention, the past chaffer sieves for corn cobs, on such combine harvesters, are replaced by improved sieves having elongated fingers on its louvered vanes, at the rear portion of the sieve. The improved rear portion constitutes from 75 to 60% of the surface of the sieve and each of the improved elongated fingers are greater than 3 inches in length. Previously, chaffer sieves for cleaning corn or cobs have such fingers being limited to no longer than 1.125 to 1.625 inches. In the present invention, whole cobs pass through the improved rear portion of the sieve, while the stalks, husks and other leafy material other than grain and cobs are kept out. The corn kernels are separately cleaned from the chaff at the front portion of the sieve. A substantial advantage of the improved rear portion fingers is provided by the finger's humped-back or rounded design, which serves to reorient the cobs flowing onto the sieve widthwise, to turn them lengthwise into the sieve openings, thus allowing whole cobs to fall through the sieve openings, while simultaneously serving as sufficient interference to stalks and husks passing over, so that fan-driven streams of air conventionally flowing from underneath the sieve can blow away whatever MOGC was not removed by the rotor. This sufficiently prevents contamination when cleaning the cobs. Furthermore, at the rear end of the sieve there is an adjustable dam portion that can be raised or lowered to stop the cobs from moving off the sieve.

In view of the above, and in accordance with the present invention, there is provided a combine cleaning system including a fan and a sieve which cooperate with each other to further separate the kernels of corn from the whole corn cobs (having had their kernels removed previously during threshing), and to further separate the whole cobs from the MOGC. The fan provides a substantially uniform flow of air up and through the sieve. The sieve comprises a slatted and louvered section or portion (with louvers being adjusted) extending rearwardly from a forward end of the sieve, and a louvered and elongated finger, corn cob cleaning portion downstream from the louvered grain cleaning area. The louvered grain cleaning portion, at the front of the sieve is configured to accommodate a flow of air therethrough from the fan and provides a level of cleaning to the threshed corn kernels blowing MOGC upwards and out of the rear end of the combine. The kernels of corn will fall through the louvered section having standard finger lengths of 1.125 to 1.625 inches and standard spacing between the fingers on the louvers of approximately 1⅝ inches. This forward corn kernel cleaning section comprises from 25 to 40% of the cleaning area of the sieve. The elongated finger section provides a second level of cleaning to the corn crop materials received thereon which are predominantly whole corn cobs and leafy material which may have passed through the rotor and are received from said rotor. This second level of cleaning to the materials received thereon allows whole corn cobs to pass through the spaces between elongated louvered fingers while receiving a flow of air blowing upward and rearwardly from the fan which serves to blow MOGC away from the chaffer sieve. This rearward, elongated finger, second portion constitutes 75 to 60%, preferably 66.7%, of the sieve's cleaning surface.

The front portion of the sieve is very standard and well known for collecting kernels of corn in the normal course of cleaning grain from the rotor of the combine harvester, but that portion is towards the front end and takes up less space of the sieve than does the rear portion. The rear elongated finger portion of the sieve is referred to as the corn cob collecting portion. Its spacing between elongated fingers is at least 3 inches wide. The rear portion is particularly characterized by the shape of said fingers, their length and the functional role played in reorienting the direction of whole corn cobs, so as to substantially enhance the volume of whole cobs passing therethrough.

DETAILED DESCRIPTION OF THE INVENTION

Figure 1:
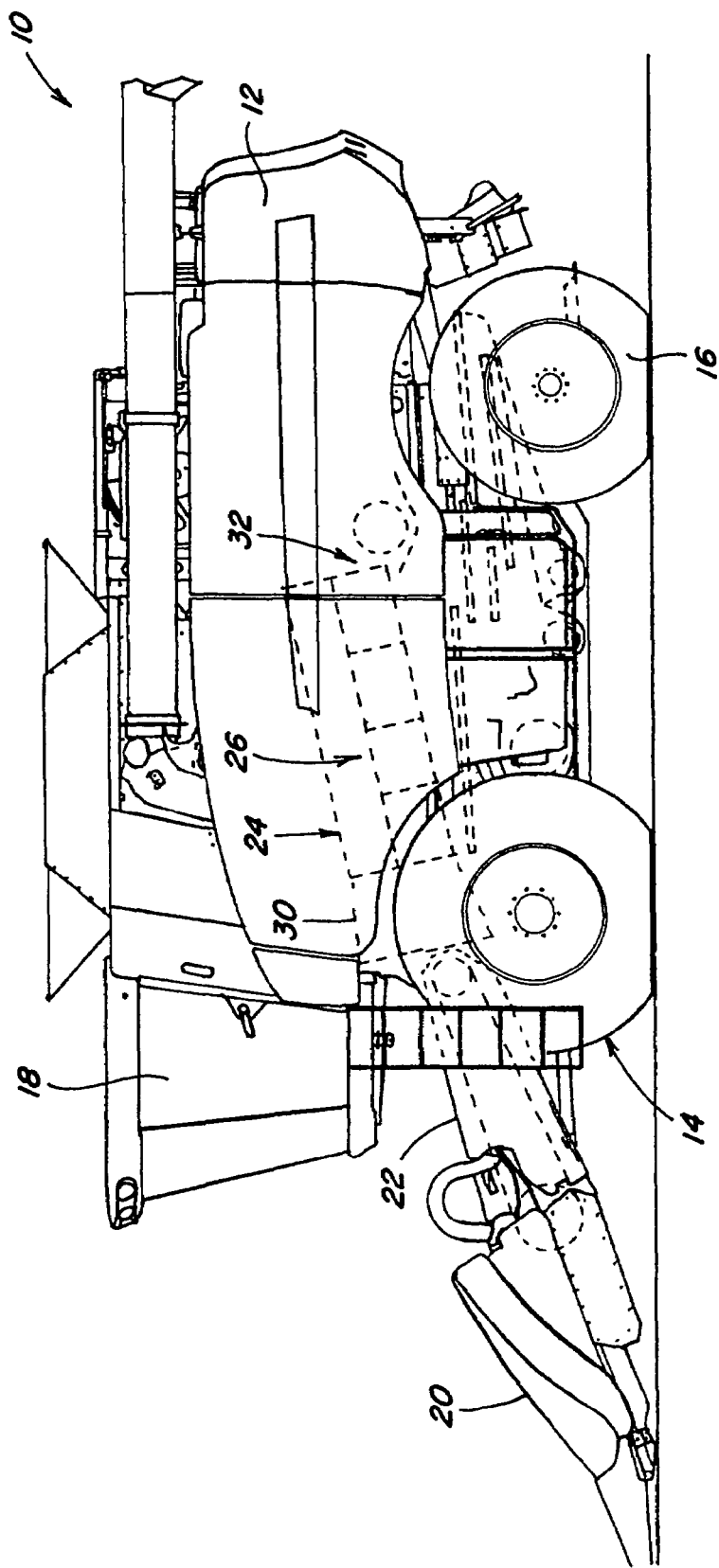
FIG. 1 is a side elevation of a combine harvester having axial flow threshing and separating units and sieves of the present invention.
Figure 2:
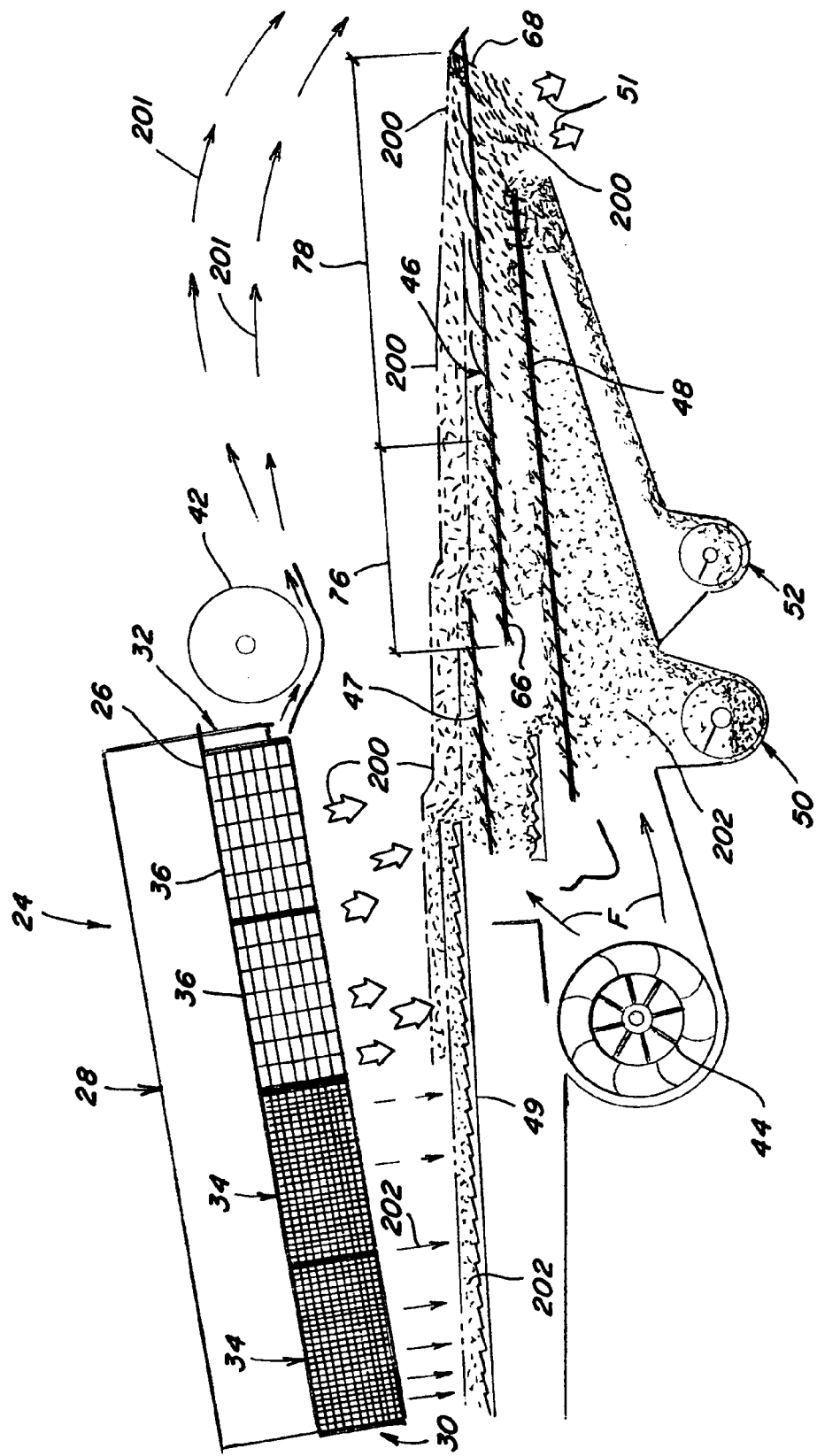
FIG. 2 is a cutaway side elevation of the cleaning system and rotor of the present invention.
Figure 3:
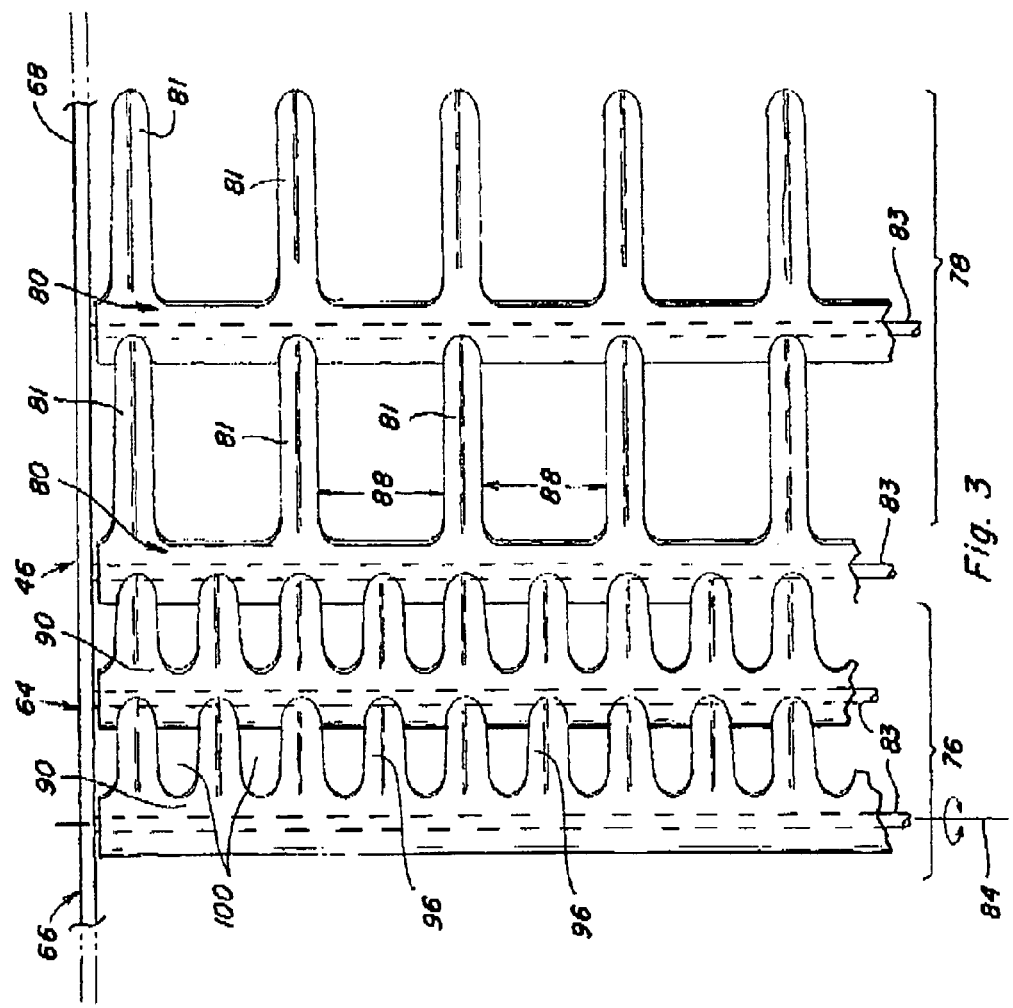
FIG. 3 is a partial top elevational view of the corn cob chaffer sieve of the present invention.
Figure 4:
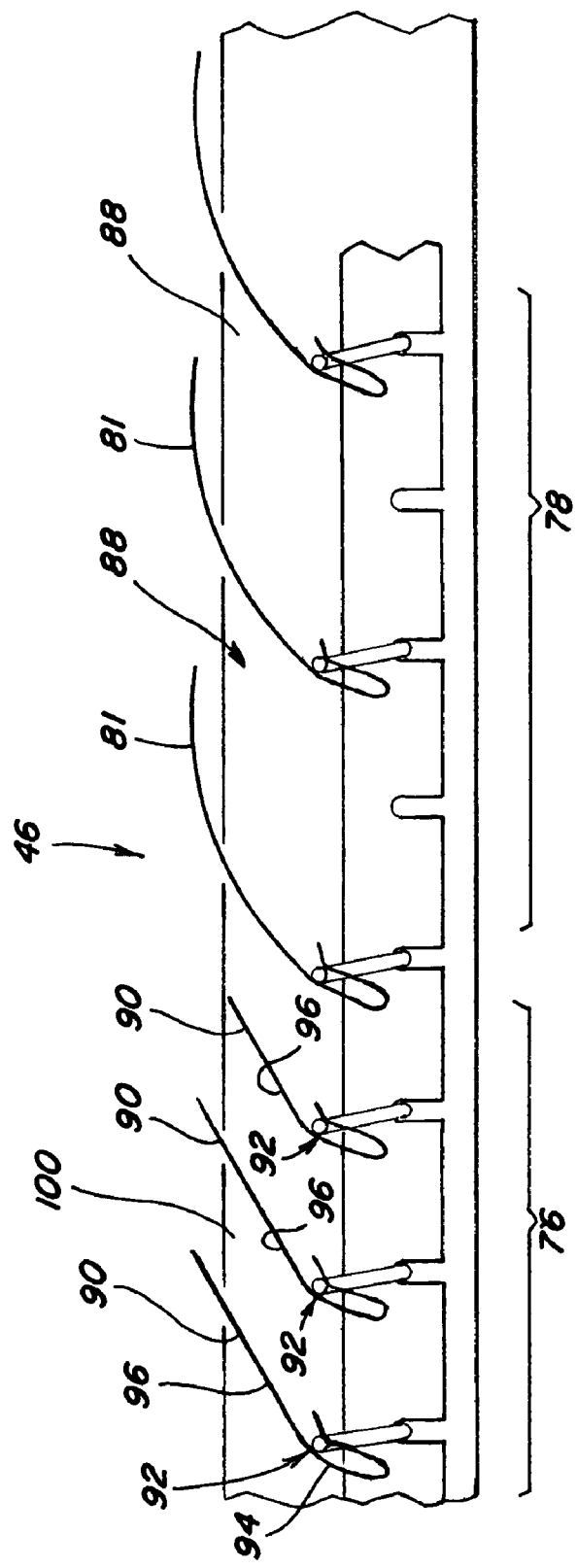
FIG. 4 is a side view of the corn cob chaffer sieve of the present invention.
Figure 5:
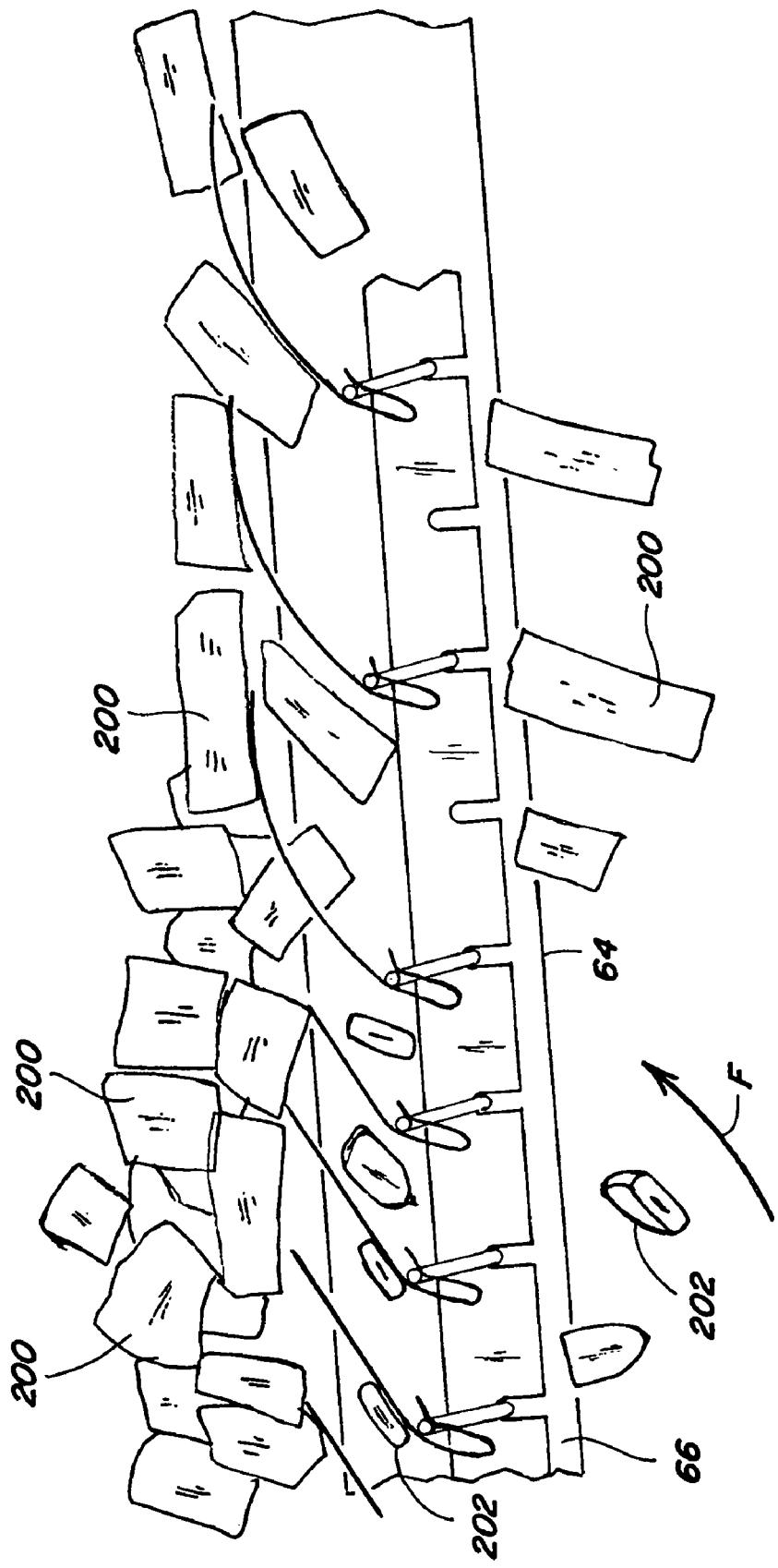
FIG. 5 is a side elevational view of the corn cob chaffer sieve of the present invention illustrating the corn kernels falling through the front of the sieve and the corn cobs falling through the rear openings in the sieve.
Figure 6:
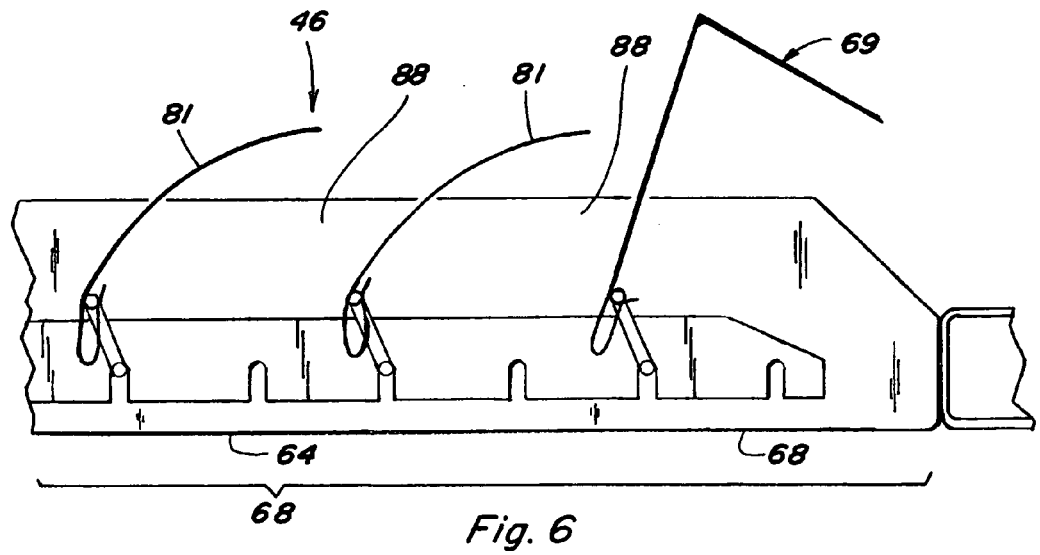
FIG. 6 is a close-up side view of the rear portion of the corn cob chaffer sieve of the present invention showing its dam portion.
Figure 7:
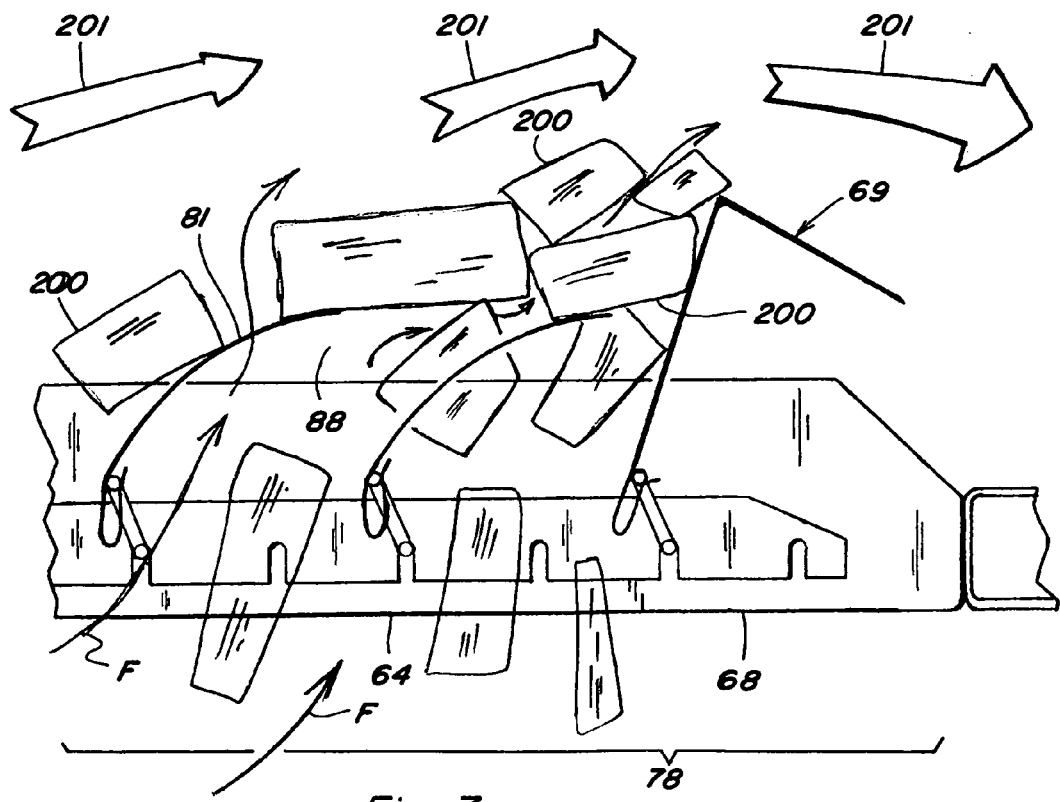
FIG. 7 is a side view of the rear of the sieve showing corn cobs being blocked by a rear end dam, while allowing material other than cobs and grain to flow over the top of the dam.

While the present invention is susceptible of embodiment in various forms, there is shown in the drawings a presently preferred embodiment thereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is shown in FIG. 1 a self-propelled combine 10. The combine 10 includes a body, or housing, 12 supported on front drive wheels 14 and steerable rear wheels 16. The combine is powered by an engine (not shown) and controlled from an operator station 18. A crop harvesting apparatus or header 20 and a feeder mechanism 22 are attached at a forward end of the combine. The feeder mechanism 22 feeds harvested corn crop material to a threshing zone or section 24, of an axial flow rotary type combine which includes a threshing cage 26 and a rotor 28. As illustrated, the threshing cage 26 has a generally cylindrical configuration, and is concentric with the rotor 28 mounted for rotation therewith.

The rotor 28 is driven from the engine and directs harvested corn crop to be threshed from an inlet or upstream end 30 of the threshing and separating zone 24 toward an exit or downstream end 32. Between the upstream 30 and downstream 32 ends of the rotor 28, the harvested corn crop is threshed several times repeatedly, as it spirals around the single large diameter rotor 28 and passes through the threshing cage 26.

For the sake of convenience, we have separately identified the front portion of the threshing cage 26 as semi-circular concaves 34 and the back portion as semi-cylindrical grates 36. Kernels of corn are threshed through the small openings of the concaves 34 at the front end of the threshing cage 26 while whole corn cobs are threshed to pass through much larger openings in special corn cob grates 36 (more thoroughly discussed in my co-pending application filed on Apr. 22, 2008, and entitled DUAL ACTION CORN COB SEPARATION AND CORN COB SEPARATOR) at the rear end of the threshing cage. The MOGC is blown by air from fan 44 and exits at downstream end 32 of the threshing cage 26. A rotary beater 42 throws the MOGC, also known as straw and other residue material, rearwardly through the combine.

A portion of chaff, straw, and other MOGC remains intermixed with the grain impelled from the front end of the threshing zone 24 through the concaves 34. Further cleaning and separating action is required. Therefore, the combine 10 further includes a cleaning system for further separating the MOGC 201 from the clean corn kernels 202 and the whole corn cobs 200.

The cleaning system includes a cleaning fan 44, a chaffer sieve 46, a first grain chaffer 47, a grain pan 49 and a lower grain sieve or shoe sieve 48, if desired (some configurations do not have this embodiment). The grain pan 49 reciprocates or moves forward moving the crop material towards the first grain chaffer 47 and the chaffer sieve 46. The corn kernels fall though the smaller openings in 47 and 46 down onto the shoe sieve and through said sieve where the predominant section falls into the clean grain auger and trough 50 and the corn kernels are carried to a bin. The whole corn cobs 200 are moved forward into the cleaning system to the forward end of the corn cob sieve 46 where they fall through the front end and are moved eventually to the corn cob bin in the direction shown by arrows as shown by arrows 51.

Including now reference to FIGS. 3, 4, 5, 6 and 7, a principal feature of the cleaning system of the present invention is the structure of the corn cob chaffer sieve 46. A cob chaffer sieve 46 includes a generally rectangular frame 64 having a forward frame end 66, a rear frame end 68, and projecting up above the surface therefrom while extending along the width across the rectangular sieve 46 is a rear dam 69. Dam 69 projects upward preferably as high as 1.5 to 2 inches above the surface of sieve 46 and is adjustable in height from preferably 0 to 2 inches to serve to stop cobs 200 from moving back beyond the chaffer 46.

A grain cleaning section 76 extends rearwardly from the forwardmost end 66 to cover preferably the first ⅓ of the cleaning surface of sieve 46. This section 66 is the corn kernel cleaning area of chaffer 46 and receives a majority of the threshed corn kernels 202 which do not fall through companion chaffer 47 which is the first level of cleaning from the grain pan 49 and threshing zone 24. Section 76 is the initial or first level of cleaning for chaffer 46 and allows corn kernels 202 to fall therethrough to shoe sieve 48, but does not allow corn cobs 200 to pass through. Forward section 76 comprises preferably standard type corn kernel openings 100 of approximately 1⅝ inches wide spacing between the fingers 96. This section is comprised of a plurality of series of laterally elongated slats or louvers 90 arranged in adjacent relationship relative to each other. Each of the slats or louvers 90 can be fabricated from metal or from a non-metallic material such as nylon material impregnated with glass fibers or for example thermoplastic resins, such as polypropylene, and/or other materials suitable to the environment in which the combine is operated. Each slat 90 has a central portion 92 (see FIG. 4), with 2 leg portion 94 and finger portion 96 extending in angularly offset directions therefrom. A series of openings or passages 100 constitute the space between fingers 96 through which corn kernels 202 fall through the sieve.

Support rods 83 extend through the width of louvers at both the front 76 and rear 78 ends and are revolvable about axis 84 to raise or lower the height of the fingers 81 or 96 above the cleaning surface of sieve 46.

Extending rearwardly from front corn kernel section 76 is rear whole corn cob section 78 extending to dam end 68. This section comprises ribs 80 that have elongated fingers 81 extending rearward therefrom in a rounded or humped shape that define openings or spacing 88 between fingers 81 which are at least about 2-4 inches, preferably at least 3 inches wide, while said fingers 81 have lengths indicated by "x", and x is preferably 3¼ inches long. The preferred spacing between the fingers at the corn cob end 78 of the chaffer 46 is twice that between the fingers of the front corn kernel end 76 of chaffer 46. Also, the spacing between louvered vanes is "y", and y is 3 to 4 inches. This rear section 78 extends to cover preferably ⅔ of the cleaning surface of the sieve and where the humped shape of fingers 81 tend to move corn cobs 200 as they flow over fingers 81 to turn lengthwise and fall through openings 88 while said humped shape blocks the lighter weight MOGC which instead blows via the fan air and traverses up through openings 88. The fan air is described by arrows marked F. The ribs 80, holding the fingers 81, extend laterally across the surface of sieve 46 at the same width of the slats or louvers 90 in forward section 76.

Figure 8:
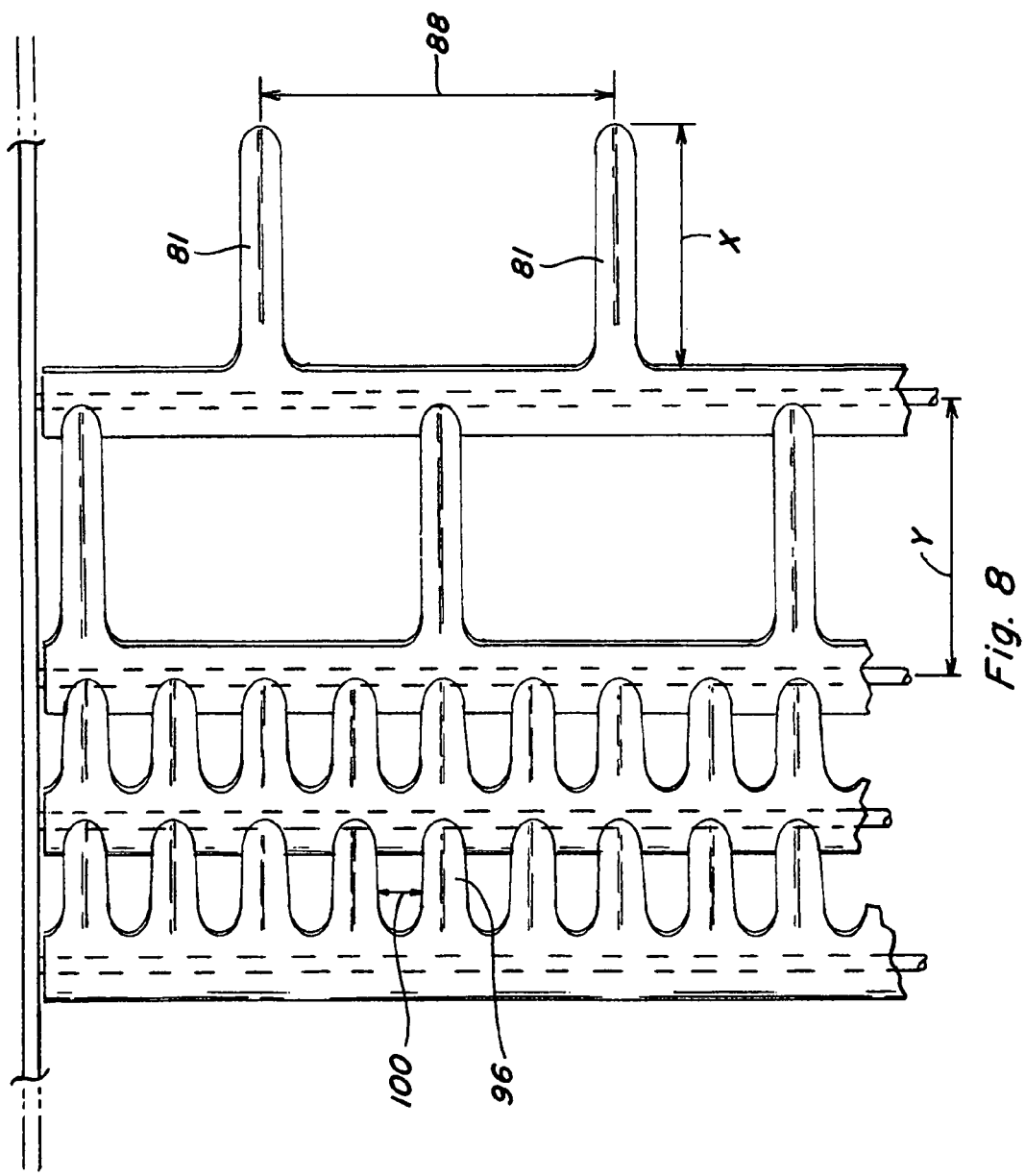
FIG. 8 is a partial top elevated view of an alternative embodiment of the chaffer sieve of the present invention having the elongated fingers in the sieve in a staggered orientation so that the fingers on one louver are staggered, i.e., not in line with the fingers of an adjacent louver.

It should be noted also that rear end 78 may have, as an alternative, a staggered configuration for its elongated fingers 81 as shown in FIG. 8.

In operation, the combine harvester 10 operates beginning with header 20 which reaps the corn crop as the combine is driven across the field. The feeder 22 delivers the harvested corn crop material to the inlet end 30 of the threshing device 24. The threshed materials are propelled from the threshing rotor (or rotors) 28 onto grain pan 49 from whence the threshed material moves onto the chaffer sieves 47 and 46. While the threshing portion 24 acts to separate corn kernels from the corn cobs and cobs from the stalks or husks therein, a substantial amount of chaff including leafy portions such as husks, tassels, straw, stalks, etc., may be directed out of the openings in the threshing apparatus 24 along with the corn kernels even though a substantial portion of that MOGC is propelled rearwardly through the rearward end 32. The MOGC 201 flows over the top of the corn cobs and out of the rear of combine 10 as a consequence of the air flow F.

In light of all the foregoing, it should thus be apparent to those skilled in the art that there has been shown and described a novel combine harvester and separation process. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. An axial flow rotary combine cleaning system comprising a chaffer sieve having a front and a rear portion, said front portion constituting 25 to 40% of the surface area of said chaffer and receiving substantially corn kernels from the front portion of a combine threshing zone; and said sieve having a rear portion constituting 75 to 60% of the surface area of the chaffer and receiving and cleaning substantially whole corn cobs having lengths of predominantly at least 3 inches;

said front portion of said sieve comprising louvered vanes with extended fingers having about 1.125 to about 1.625 inches spacing between said extended fingers;

said rear portion of the sieve comprising louvered vanes with elongated fingers about twice the length of the front portion's extended fingers, and said elongated fingers being greater than 3 inches in length and having 2 to 4 inches spacing taken in the transverse to fore and aft direction of the crop material flow between said elongated finger and 3 to 4 inches spacing between the louvers; and said rear portion's elongated fingers having humped or rounded profile which effectively turns the widthwise flow of corn cobs over the surface of the chaffer so as to reorient the whole cobs having lengths longer than the width between the fingers, to a lengthwise orientation for accommodating their passing through the openings between the elongated fingers.

2. The cleaning system of claim 1 wherein the rear portion elongated fingers of each vane are in line with the elongated fingers of the adjacent vanes.

3. The cleaning system of claim 1 wherein the rear portion elongated fingers are staggered, rather than being in line with the elongated fingers of the adjacent vane.

4. The sieve of claim 1 wherein the front portion occupies about 33.3% and the rear about 66.7% of the surface area.

5. The sieve of claim 1 wherein said chaffer comprises a dam at the rear end portion of said sieve, projecting as high as about 1.5 to 2 inches above the sieve surface fingers, inhibiting corn cobs from overflowing the chaffer while allowing MOGC to be blown over the top of the sieve and out the rear of the combine.

6. The cleaning system of claim 1 wherein the corn cob chaffer sieve lies beneath the threshing zone of the combine and urges crop material flow from front to the back of the combine harvester.

* * * * *